(12) United States Patent
Gamache et al.

(10) Patent No.: US 10,162,135 B2
(45) Date of Patent: Dec. 25, 2018

(54) OPTICAL TRANSMITTER ASSEMBLY FOR VERTICAL COUPLING

(71) Applicant: Lumentum Operations LLC, Milpitas, CA (US)

(72) Inventors: Claude Gamache, Gatineau (CA); Nicolas Belanger, Gatineau (CA); Scott Cameron, Ottowa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/632,917

(22) Filed: Jun. 26, 2017

(65) Prior Publication Data

US 2017/0293094 A1  Oct. 12, 2017

Related U.S. Application Data

(63) Continuation of application No. 14/800,417, filed on Jul. 15, 2015, now abandoned.

(51) Int. Cl.
*G02B 6/42* (2006.01)

(52) U.S. Cl.
CPC ......... *G02B 6/4206* (2013.01); *G02B 6/4208* (2013.01); *G02B 6/4213* (2013.01); *G02B 6/4214* (2013.01); *G02B 6/4251* (2013.01); *G02B 6/4257* (2013.01)

(58) Field of Classification Search
CPC .. G02B 6/4206; G02B 6/4257; G02B 6/4208; G02B 6/4213; G02B 6/4214; G02B 6/4251
See application file for complete search history.

(56) References Cited

U.S. PATENT DOCUMENTS

| | | | |
|---|---|---|---|
| 6,872,012 B2 | 3/2005 | Watanabe | |
| 8,165,431 B2 | 4/2012 | De Dobbelaere et al. | |
| 8,168,939 B2 | 5/2012 | Mack et al. | |
| 8,772,704 B2 | 7/2014 | Mack et al. | |
| 8,895,413 B2 | 11/2014 | Pinguet et al. | |
| 8,923,664 B2 | 12/2014 | Mekis et al. | |
| 9,053,980 B2 | 6/2015 | Pinguet et al. | |
| 2006/0078262 A1* | 4/2006 | Chen | G02B 6/4206 385/93 |
| 2009/0154872 A1* | 6/2009 | Sherrer | G02B 6/4248 385/14 |
| 2010/0006784 A1* | 1/2010 | Mack | G02B 6/34 250/551 |
| 2015/0185426 A1* | 7/2015 | Miao | G02F 1/093 385/33 |
| 2015/0219847 A1* | 8/2015 | Mack | G02B 6/4286 385/14 |
| 2017/0017050 A1 | 1/2017 | Gamache et al. | |

* cited by examiner

*Primary Examiner* — Ryan Lepisto (74) *Attorney, Agent, or Firm* — Harrity & Harrity, LLP (57) ABSTRACT

The invention relates to an optical transmitter assembly (OTA) for vertical coupling of light into a chip, and to a method for manufacturing the OTA. The OTA includes a laser diode, a microlens and a turning mirror mounted at a top face of a supporting substrate within a sealed enclosure, and an optical component, such as an optical isolator, a polarizer, or a microlens disposed in a substrate cavity that opens to the back face of the substrate. The optical component may be placed into the cavity after the enclosure is sealed.

20 Claims, 10 Drawing Sheets

OPTICAL TRANSMITTER ASSEMBLY FOR VERTICAL COUPLING

RELATED APPLICATION

This application is a continuation of U.S. patent application Ser. No. 14/800,417, filed Jul. 15, 2015, the disclosure of which is incorporated herein by reference.

TECHNICAL FIELD

The present invention generally relates to optoelectronic circuits, and more particularly relates to an optical transmitter assembly for coupling light vertically into a planar integrated circuit.

BACKGROUND

Silicon-based integrated circuits incorporating planar optical waveguides and light processing elements such as optical modulators, receivers, attenuators, splitters, combiners, amplifiers etc. are being developed and used in a variety of applications. Examples of such circuits, which may be referred to as silicon photonics (SiP) chips, include optical interconnects and optical routers, among others. However, conventional silicon photonics (SiP) chips cannot generate light at typical optical communication wavelengths in the 1.3 µm and 1.55 µm ranges, so that light of these wavelengths has to be coupled into a SiP chip from an external laser, typically a semiconductor laser diode (LD) emitting at the desired wavelength. What is needed is an optical transmitter assembly that has a small footprint, protects the LD from the environment and back reflections, and is configured to couple light generated by the LD directly into a SiP chip at a desired location on the chip.

SUMMARY

Accordingly, the present disclosure relates to an optical transmitter assembly (OTA) for vertical coupling of light into an integrated circuit (IC) chip, the OTA comprising a substrate, a laser diode, a turning mirror, and a polarization processing element, wherein the laser diode and the polarization processing element are disposed at opposing sides of the substrate, and wherein the turning mirror is configured to re-direct an optical path from the laser diode through the substrate and the polarization processing element. The polarization processing element may be disposed in a cavity in the supporting substrate.

In the context of this specification, "vertical coupling" means coupling light into a planar chip from a main face of the chip as opposed to coupling into an edge thereof, and is not limited to optical coupling at normal incidence.

One aspect of the present disclosure provides an optical transmitter assembly (OTA) comprising: a substrate having a first face and a second face opposing the first face; a laser diode (LD) disposed at the first face of the substrate and configured to emit a light beam along the substrate; a turning mirror provided at the first face of the substrate and configured to re-direct the light beam to propagate through the substrate emerging from the second face thereof; and a first microlens disposed between the LD and the turning mirror and configured to at least partially collimate or focus the light beam. The substrate includes a cavity that is open to the second face and positioned in an optical path of the light beam; the cavity is configured for placing therein a polarization processing or collimating optical element from the second face of the substrate. According to one feature of the present disclosure, the OTA may comprise one or more polarization processing optical components disposed within the cavity. According to another feature of the present disclosure, the OTA may comprise a microlens disposed within the cavity.

One aspect of the present disclosure provides an optical transmitter assembly (OTA) comprising: a substrate having a first face and a second face opposing the first face; a lid attached to the substrate so as to form an enclosure at the first face thereof; a laser diode (LD) mounted within the enclosure and configured to emit a light beam along the substrate; a turning mirror provided within the enclosure and configured to re-direct the light beam to propagate through the substrate into the CMOS chip when the OTA is mounted upon the CMOS chip at the second face; and a first microlens disposed within the enclosure optically between the LD and the turning mirror and configured to at least partially collimate or focus the light beam. The substrate includes a cavity positioned in an optical path of the light beam and configured for placing therein a polarization processing optical component from the second face of the substrate.

One aspect of the present disclosure provides an optical transmitter assembly (OTA) comprising: a substrate having a first face and a second face opposing the first face; a lid attached to the substrate so as to form an enclosure at the first face thereof; a laser diode (LD) mounted within the enclosure and configured to emit a light beam along the substrate; a turning mirror provided within the enclosure and configured to re-direct the light beam to propagate through the substrate into the CMOS chip when the OTA is mounted upon the CMOS chip at the second face; and a first microlens disposed within the enclosure optically between the LD and the turning mirror and configured to at least partially collimate or focus the light beam. A polarization processing optical component is disposed within a cavity in the substrate that opens to the second face of the substrate and is positioned in an optical path of the light beam.

One aspect of the present disclosure provides an optical transmitter assembly (OTA) comprising: a substrate having a first face and a second face opposing the first face; a lid attached to the substrate so as to form an enclosure at the first face thereof; a laser diode (LD) mounted within the enclosure and configured to emit a light beam along the substrate; a turning mirror provided within the enclosure and configured to re-direct the light beam to propagate through the substrate into the CMOS chip when the OTA is mounted upon the CMOS chip at the second face; a first microlens disposed within the enclosure optically between the ID and the turning mirror and configured to at least partially collimate or focus the light beam; and a second microlens disposed within a cavity in the substrate in an optical path of the light beam optically after the turning mirror.

Another aspect of the present disclosure provides a method of making an optical transmitter assembly (OTA), the method comprising:

a) providing a light source sub-assembly fixedly disposed at a first face of a substrate, the substrate having a cavity that is open to a second face of the substrate opposing the first face, the light source sub-assembly comprising a laser diode (LD) disposed at the first face of the substrate and configured to emit a light beam along the substrate, a turning mirror configured to direct the tight beam through the substrate to be output from a second face of the substrate opposing the first face thereof, and a first microlens disposed between the LD and the turning mirror and configured to at least partially collimate or focus the light beam; and b) placing a polarization processing or collimating optical element into the cavity from the second face in an optical path of the light beam.

The method may further comprise c) affixing a lid to the substrate at the first face thereof so as to form a sealed enclosure housing the light source sub-assembly. The sealed enclosure may be hermetic or may not be hermetic, as needed.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein.

DETAILED DESCRIPTION

In the following description, for purposes of explanation and not limitation, specific details are set forth, such as particular optical circuits, optical components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Note that as used herein, the terms "first", "second" and so forth are not intended to imply sequential ordering, but rather are intended to distinguish one element from another unless explicitly stated. Similarly, sequential labeling of method steps or operations do not imply sequential order of their execution. The terms 'polarization processing component' and 'polarization component' are used herein interchangeably to refer to optical components whose effects on incident light depend substantially on the light's polarization, such as optical isolators, polarizers, polarization rotators, polarization beam splitters, and wave plates.

Figure 1:
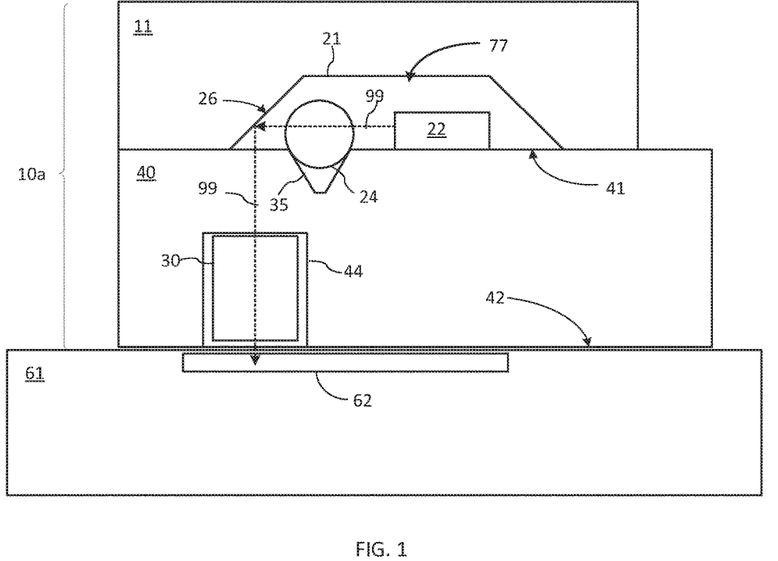
FIG. 1 is a schematic diagram of an optical transmitter assembly (OTA) for vertical coupling into a photonics chip, the OTA including a laser diode disposed at a first face of a supporting substrate and covered with a lid, and an optical isolator disposed in a back cavity that opens to a second face of the substrate opposing the first face.

With reference to FIG. 1, there is schematically illustrated an optical transmitter assembly (OTA) 10a for coupling light into a SiP chip 61 in accordance with one embodiment of the present disclosure. SiP chip 61 may include an optical waveguide 62 wherein light from OTA 10a may be coupled, for example using a coupling grating formed in or upon the waveguide 62 as known in the art. OTA 10a includes a light source sub-assembly 77 disposed at a first face 41 of a supporting substrate or base 40, the supporting substrate or base 40 having a second face 42 opposing the first face. The light source sub-assembly 77 may include a laser diode (LD) a 22, a microlens 24, and a turning mirror 26. The LD 22 may be mounted upon or over the first face 41 of the substrate 40 and configured to emit a light beam 99 along the substrate 40. The first face 41 of the substrate 40 may be referred to herein as the top substrate face 41 or the first substrate face 41, while the second face 42 of the substrate 40 may be referred to herein as the back face 42, bottom substrate face 42, or the second substrate face 42. The supporting substrate 40 may be, for example, made from silicon (Si), silica (SiO2), including fused silica and quartz, or other suitable material that is transparent to the light beam 99. The LD 22 may be, for example, an edge-emitting laser diode, such as but not limited to a DFB laser diode, and may emit in the 1.3 µm wavelength range or the 1.55 µm wavelength range, or at any other suitable wavelength. The LD 22 may be mounted upon the first substrate face 41 using any suitable laser mounting techniques known in the art.

The turning mirror 26 is located in the optical path of the light beam 99 at the first face 41 of the substrate 40. It is configured to re-direct the light beam 99 to propagate through the substrate 40 so as to emerge from the second substrate face 42 and couple into the SiP chip 61 when OTA 10a is mounted above or upon the SiP chip 61 with the second substrate face 42 proximate to a top face of the chip 61. The microlens 24 may be disposed optically between the LD 22 and the turning mirror 26 and configured to at least partially collimate or focus the light beam 99. The microlens 24, which may also be referred to herein as the first microlens, may be a ball lens or an aspheric lens, for example, and may be mounted, e.g. glued, in an opening 24 defined in the first substrate face 41. The substrate 40 includes a back cavity 44 that is positioned in the optical path of the light beam 99 where it traverses the substrate 40, and is configured for placing therein a polarization processing optical element from the second face 42 of the substrate 40. The back cavity 44 may be open at the second substrate face 42. In the illustrated embodiment, the back cavity 44 includes an optical isolator 30, configured to prevent deleterious back reflections into the LD 22 from the SiP chip 61. In one embodiment, the back cavity 44 is configured to receive the entire optical isolator 30, so that OTA may be mounted on the chip 61 flush with the top face thereof. In one embodiment, the entire optical isolator 30 may be slightly recessed into the cavity, for example a few micrometers or 10-50 micrometers, in order to reduce the likelihood of the isolator being damaged during handling.

Figure 2A:
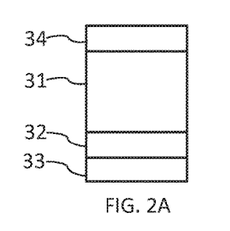
FIGS. 2A-2C are schematic diagrams representing three different exemplary embodiments of the optical isolator of the OTA shown in FIG. 1.
Figure 2B:
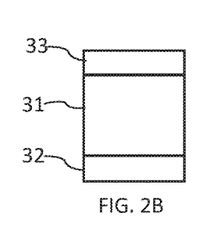
Figure 2C:
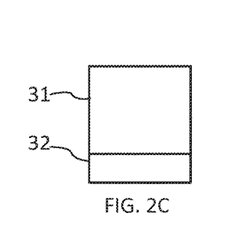

Referring now to FIGS. 2A-2C, the optical isolator 30 may generally include a non-reciprocal polarization rotator 31 and a half-wave plate (HWP) 33, and may further include one or two polarizers 32, 33. The non-reciprocal polarization rotator 31 may be, for example, a Faraday rotator, and may also be referred to herein as the polarization rotator 31 or simply as the rotator 31. In one embodiment illustrated in FIG. 2A, the optical isolator 30 is formed by the non-reciprocal polarization rotator 31 sandwiched between the first polarizer 32 and the second polarizer 34, with the HWP 33 following optically the first polarizer 32. FIG. 2B illustrates another embodiment of the optical isolator that includes a single polarizer 32, which in the illustrated embodiment is positioned optically after the rotator 33, with the HWP 33 in-front of the rotator 31. The HWP 33 may also be placed between the polarization rotator 31 and the polarizer 32, or generally at any position in the chain of the polarization components forming the optical isolator 30 of FIGS. 2A and 2B. FIG. 2C illustrates an embodiment wherein the optical isolator 30 is formed by the rotator 31 followed or preceded by the HWP 33 without polarizers; the embodiment of FIG. 2C may also be referred to herein as an incomplete optical isolator or a partial optical isolator. In each of these embodiments, the constituent components of the optical isolator 30, such as the polarization rotator 31, the HWP 33, and, when present, the polarizers 34, 32 may be glued together as known in the art to form an integral optical isolator component.

Figure 3:
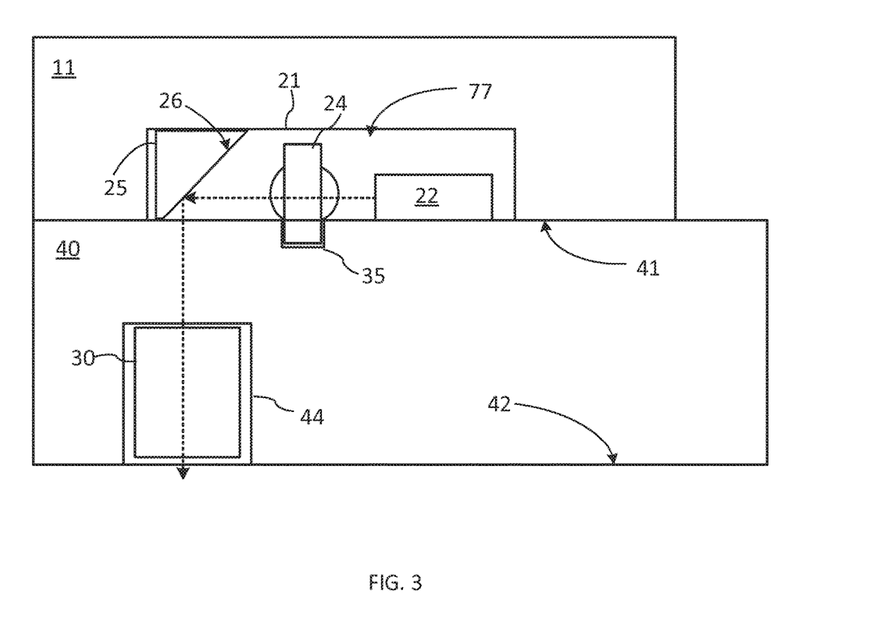
FIG. 3 is a schematic diagram illustrating a modification of the OTA of FIG. 1 with a turning mirror formed by a prism.

Turning back to FIG. 1, OTA 10a may further include a lid 11 that may be affixed to the substrate 40 at the first face 41 thereof and configured to form with the substrate 40 an enclosure 21 wherein the LD 22, the first microlens 24, and the turning mirror 26 are located. The enclosure 21 may also be referred to herein as the LD compartment 21. The lid 11 may be affixed to the substrate 40 using a suitable sealing material so as to enable hermetic sealing of the optical components 22, 24 within the enclosure 21 to protect them from the environment. By way of example, the lid 11 may be affixed to the substrate 40 with an epoxy, solder, or glass frit as known in the art. The enclosure 21 may also be sealed non-hermetically, when hermetic sealing is not needed. An exemplary list of materials from which the lid 11 may be made includes, but is not limited to, glass, quartz, silicon, fused silica, or ceramic. The turning mirror 26 may be in the form of a reflective surface formed in the lid 11 as shown in FIG. 1, but may also be a reflective surface of a separate component mounted upon the first face 41 of the substrate 40, or affixed to the lid 11, and configured to direct the laser light beam 99 into the substrate. FIG. 3 illustrates an exemplary embodiment wherein mirror 26 is provided by a reflective surface of a prism 25, which may be affixed either to the top substrate face 41 or to the lid 11. Having the turning mirror 26 provided by a separate component may be suitable in embodiments wherein the cavity in the lid 11 enclosing the LD 22 is substantially rectangular in shape; for example, when the lid 11 is made from ceramic. FIG. 3 also shows the microlens 24 embodied as an aspheric lens by way of example. In the embodiments of FIGS. 1 and 3, as well as in other embodiments described hereinbelow, the reflective surface of the turning mirror 26 may be coated with a high-reflectivity coating as known in the art.

The process of affixing the lid 11 to the substrate 40 may include heating the OTA 10a to an elevated temperature, for example up to 150-180 centigrade or greater, to seal the enclosure 21. Heating the optical isolator 30 to temperatures required for sealing the enclosure may damage the optical isolator 30, for example due to delatching of its constituent components, or it may be detrimental for the isolator performance. Advantageously, locating the optical isolator 30 in the back cavity 44 of the substrate 40 enables placing the optical isolator 30 after the lidding process is completed, and the OTA is cooled and tested, thereby substantially eliminating or at least reducing the danger of the isolator failure, and saving fabrication time. Furthermore, the isolator 30 located within the back cavity 44 that opens to the back face of the substrate may be replaced, when needed, without opening the lid 11, thereby reducing the possibility of accidental damage to the optical components within the enclosure 21. Furthermore, placing the isolator 30 in the back cavity 44 enables reducing the footprint of the OTA, and therefore lowering its cost. Furthermore, the optical isolator 30, which is a relatively expensive component, can be installed in only those OTAs that have passed required electro-optical tests, which saves fabrication time and further reduces the average cost of the final device.

FIGS. 1 and 3 illustrate embodiments wherein all of the polarization processing components forming the optical isolator 30 are placed in the back cavity 44 of the base 40. In other embodiments one or more components of the optical isolator 30 may be mounted within the LD compartment 21; examples of such embodiments are illustrated in FIG. 49.

Figure 4:
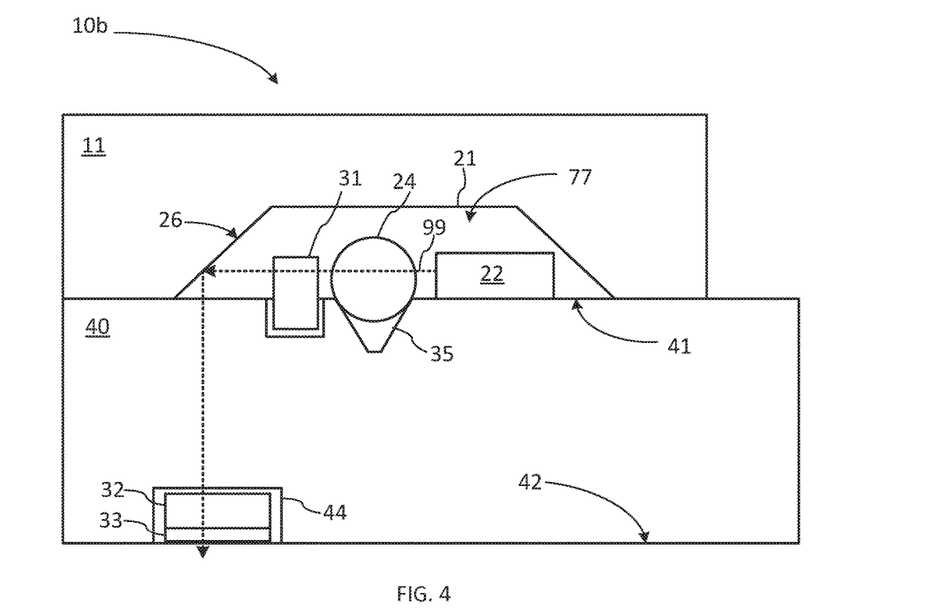
FIG. 4 is a schematic diagram of an OTA including a laser diode and a polarization rotator disposed at the first substrate face, and a half-wave plate and a polarizer disposed in the back cavity that opens to the second face of the substrate.
Figure 5:
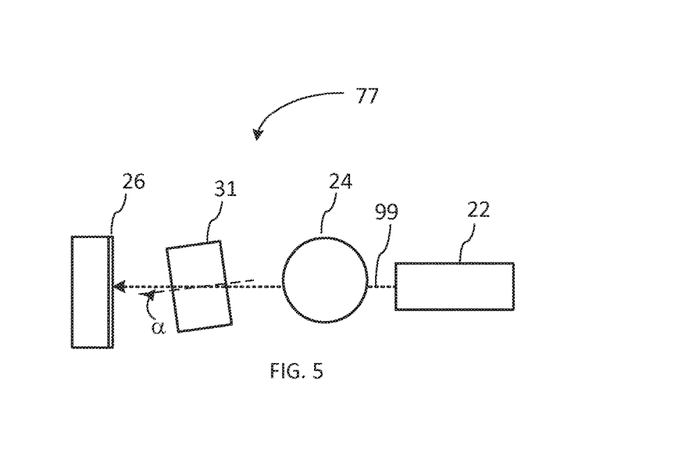
FIG. 5 is a plan view illustrating the optical components of the OTA of FIG. 4 that are disposed at the first face of the supporting substrate.

Turning first to FIG. 4, there is schematically illustrated OTA 10b in accordance with an exemplary embodiment of the present disclosure. OTA 10b differs from OTA 10a in that the light source sub-assembly 77 of OTA 10b includes the polarization rotator 31 that is mounted at the top substrate face 41 within the LD enclosure 21, in the optical path of the light beam 99 between the turning mirror 26 and microlens 24. As illustrated in FIG. 5 wherein the optical components of the light source sup-assembly 77 of OTA 10b disposed within the enclosure 21 are shown in a plan view, the polarization rotator 31 may be rotated by a small angle α in the plane of the substrate in order to prevent back reflections into the laser 22; by way of example, α ~6°. In one embodiment, the polarization rotator 31 may be preceded optically by the first polarizer 34 (not shown in the figure), which may be for example glued to the rotator 31. The back cavity 44 houses the polarizer 32 and the MVP 33, without a polarization rotator. The polarizer 32 and the HWP 33 may be glued or laminated together to form an integral polarization component 32/33. Advantageously, locating this polarization component in the back cavity 44 of the substrate 40 enables adding it to the OTA 10b after the lidding process is completed and OTA is cooled and tested, thereby substantially eliminating or at least reducing the likelihood of damaging the polarization component 32/33 and saving time. Furthermore, the polarization component 32/33 may be replaced, when needed, without opening the lid 11, thereby reducing the possibility of an accidental damage to the optical components within the enclosure 21. Furthermore, placing the polarization component 32/33 in the opening 44 in the back face of the substrate 40 enables reducing the footprint of the OTA. Furthermore, the expensive polarization processing components 32, 33 of the optical isolator may only be mounted for assembly 10b meeting all the electro-optical requirements, therefore leading to cost reduction of the final assembly.

Figure 6:
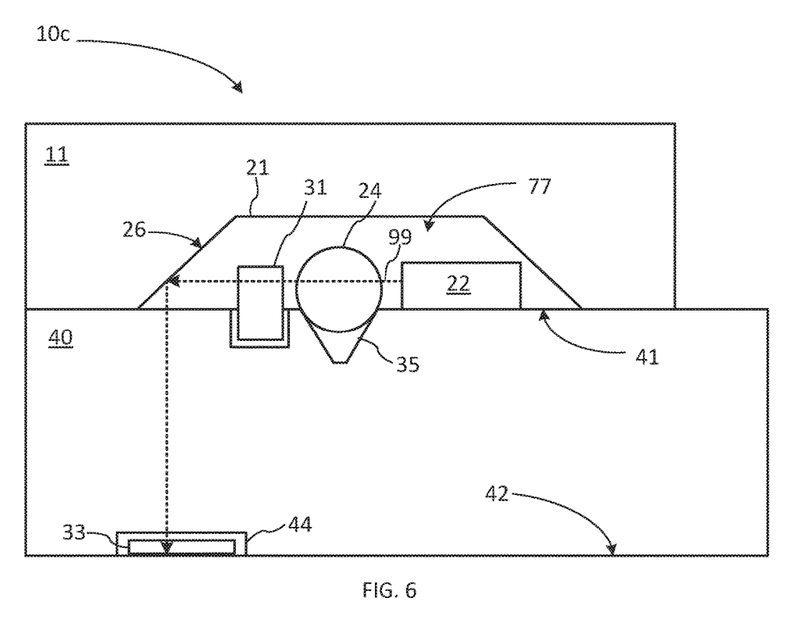
FIG. 6 is a schematic diagram of an OTA including a laser diode, a lens, and a polarization rotator disposed at the first face of a supporting substrate, and a half-wave plate disposed in the back cavity that opens to the second side of the substrate.

With reference to FIG. 6, there is schematically illustrated OTA 10c in accordance with an exemplary embodiment of the present disclosure. OTA 10c is similar to OTA 10b, except that OTA 10c the back cavity 44 may include a single polarization processing component, for example the HWP 33. The polarization rotator 31 may be affixed at the top substrate face 41 within the enclosure 21 between the turning mirror 26 and microlens 24, and may be rotated by the small angle α in the plane of the substrate to reduce back reflections into the LD 22; α may be about 6°. In one variant of this embodiment, the back cavity 44 may house the polarizer 32, and the HWP 33 may be either present or absent from OTA 10c.

Figure 7:
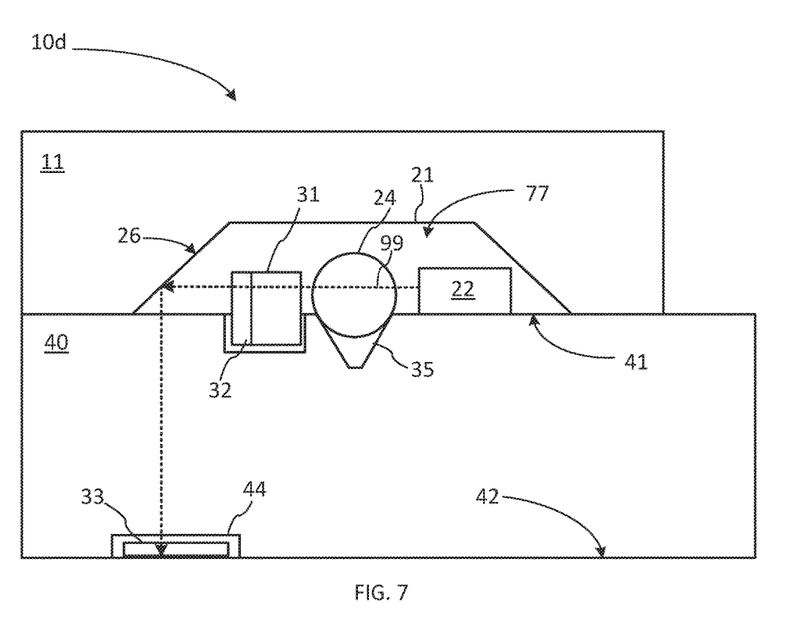
FIG. 7 is a schematic diagram of an OTA including a laser diode and a partial optical isolator disposed at the first side of the supporting substrate, and a half-wave plate disposed in the back cavity that opens to the second face of the substrate.

With reference to FIG. 7, there is schematically illustrated OTA 10d in accordance with an exemplary embodiment of the present disclosure. OTA 10d is similar to OTA 10c, except that in OTA 10d the light source sub-assembly 77 at the top substrate face 41 includes both the polarizer 32 and polarization rotator 31 as an incomplete optical isolator; components 31 and 32 may be affixed, one after another, at the top substrate face 41 within the LD enclosure 21 in the optical path between the turning mirror 26 and microlens 24. The back cavity 44 houses the polarizer 33, without a polarization rotator or a polarizer. In a variant of this embodiment, the HWP 33 may be disposed in the optical path of the light beam 99 within the LD enclosure 21, for example affixed to the rotator 31 at either side thereof, and the polarizer 32 disposed within the back cavity 44.

Advantageously, locating a polarization component such as the HWP 33 or the polarizer 33 in the back cavity 44 of the substrate 40 enables adding that polarization component to the OTA after the lidding process is completed and OTA 10a is cooled and tested, thereby substantially eliminating or at least reducing the likelihood of damaging the polarization component placed in the back cavity 44, and saving time. Furthermore, the polarization component placed in the back cavity 44 may be replaced, when needed, without opening the lid 11, thereby reducing the possibility of an accidental damage to the optical components within the enclosure 21. Furthermore, placing the HWP 33 or the polarizer 32 in the opening 44 in the back face of the substrate 40 enables reducing the footprint of the OTA.

Figure 8:
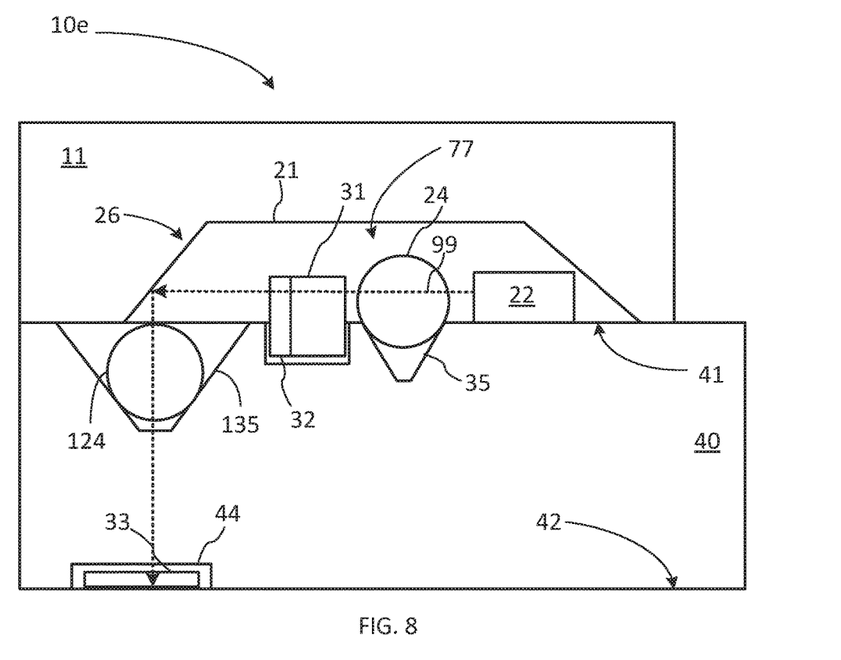
FIG. 8 is a schematic diagram of an OTA including two microlenses disposed at the same face of the supporting substrate.

With reference to FIG. 8, there is schematically illustrated OTA 10e in accordance with an exemplary embodiment of the present disclosure. OTA 10e is similar to OTA 10d, except that OTA 10d additionally includes a second microlens 124 disposed optically after the turning mirror 26 in the optical path of the beam 99 traversing the substrate 40. The second microlens 124 may be disposed in an opening 135 in the top substrate face 41. The second microlens 124 may be configured to shape the light beam 99 prior to egress from the OTA. The use of two microlenses 24 and 124 enables better coupling efficiency into the SiP chip 61. The two microlenses 24 and 124 may be, either two ball lenses, a ball and a asphere lens or two asphere lenses. In some variants of OTA 10e the substrate 40 may lack the back cavity 44, and the HWP 33 may be either omitted or mounted within the enclosure 21. The substrate 40 may also be made longer and/or the lid 11 configured so as to include the lens opening 125 fully within the enclosure 21.

Figure 9:
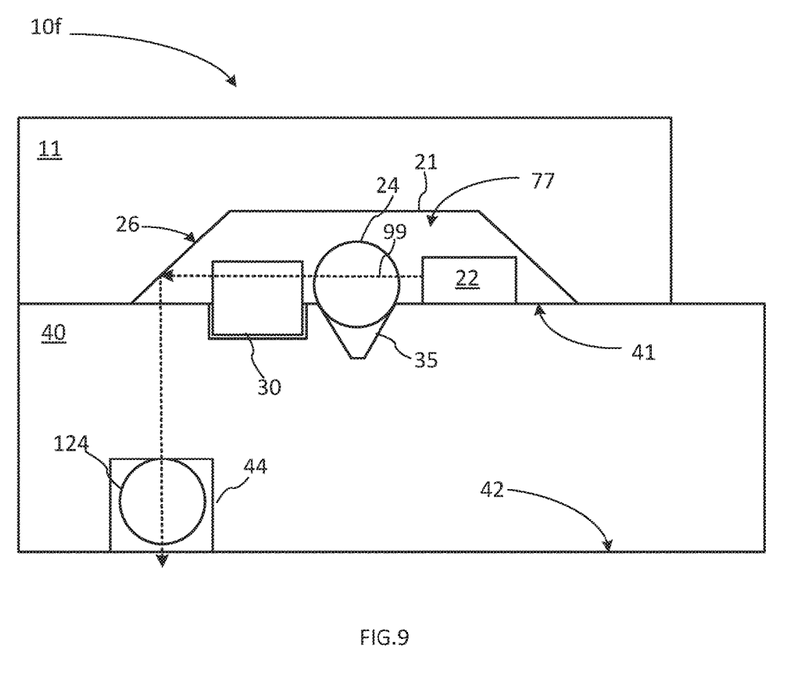
FIG. 9 is a schematic diagram of an OTA including two microlenses disposed at the opposite faces of the supporting substrate.

With reference to FIG. 9, there is schematically illustrated OTA 10f in accordance with an exemplary embodiment of the present disclosure. OTA 10f may be viewed as a variant of OTA 10e, wherein the second microlens 124 is disposed in the back cavity 44 in the optical path of the beam 99 traversing the substrate 40. The LD enclosure 21 may include the optical isolator 30 disposed in the optical path of the light beam 99, for example between the microlens 24 and the turning mirror 26. The optical isolator 30 may be embodied, for example, as described hereinabove with reference to FIG. 2A, FIG. 2B, or FIG. 2C, or as a variant thereof. Furthermore, in one embodiment at least one of the components of the isolator 30, such as for example the HWP 33 or the polarizer 32, may be disposed within the back cavity 44 on either side of second microlens 124. Similarly to OTA 10e, the use of the two microlenses 24 and 124 in OTA 10f enables better coupling efficiency into the SiP chip 61. The two microlenses 24 and 124 may be either two ball lenses, a ball and an aspheric lens, or two aspheric lenses. In some variants of OTA 10e, the substrate 40 may lack the back cavity 44, and the HWP 33 may be either omitted or mounted within the enclosure 21.

In the exemplary embodiments described hereinabove, the enclosure 21 is formed substantially by an opening within the lid 11 wherein the LD 22 and the microlens 24 are located; one of the walls of this opening may be inclined and coated to form the turning mirror 26. It will be appreciated, however, that any of the embodiments described hereinabove may be modified so that the turning mirror 26 is provided by an inclined wall formed within the substrate 40.

Figure 10:
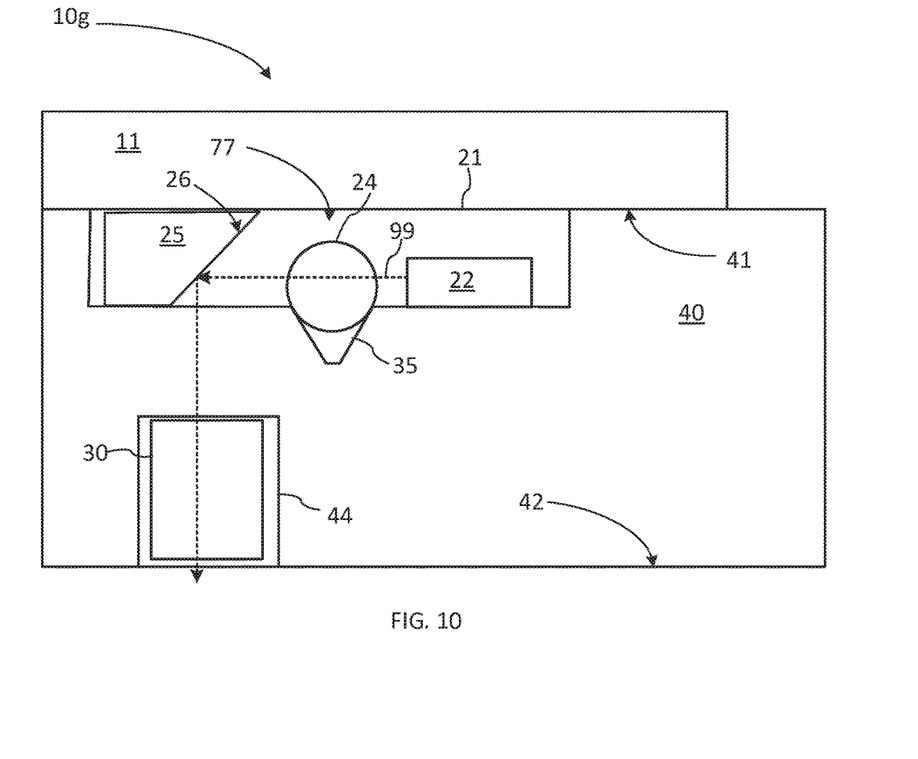
FIG. 10 is a schematic diagram of a modified OTA of FIG. 1 wherein the laser diode is positioned in the enclosure formed by a cavity in the supporting substrate.

With reference to FIG. 10, there is schematically illustrated OTA 10g in accordance with an exemplary embodiment of the present disclosure. OTA 10g is similar to OTA 10a and may be substantially as described hereinabove with reference to FIG. 1, except that in OTA 10g the enclosure 21 housing the LD 22 is formed substantially by an opening within the substrate 40 at the top substrate face 41. The turning mirror 26 is provided by an inclined reflecting face of a prism 25, which can be mounted upon the substrate 40 or to the lid 11. It will be appreciated that OTAs 10b-e illustrated in FIGS. 2-5 may be similarly modified to provide the turning mirror 26 by an inclined surface formed in the substrate 40.

Figure 11:
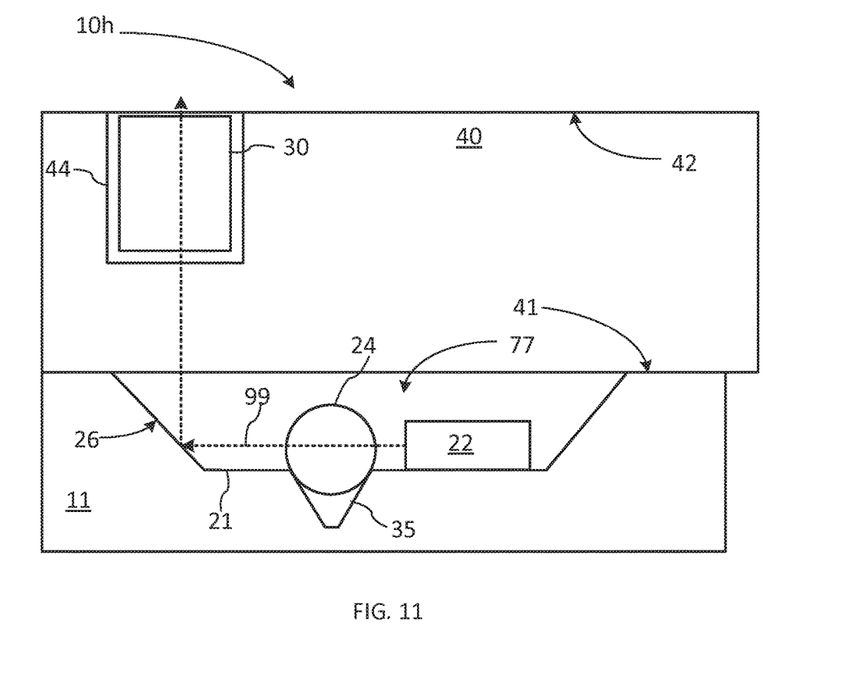
FIG. 11 is a schematic diagram of a modified OTA of FIG. 1 wherein the laser diode and the microlens are mounted to the lid.

With reference to FIG. 11, there is schematically illustrated OTA 10h in accordance with an exemplary embodiment of the present disclosure. OTA 10h is similar to OTA 10a and may be substantially as described hereinabove with reference to FIG. 1, except that in OTA 10h the LD 22 and the microlens 24, while being disposed in the enclosure 21 formed by the first substrate face 21 and the lid 11, are affixed to the lid 11 rather than to the substrate 40, with the isolator 30, or one or more of the polarization components 31-33 thereof, disposed in the back cavity 44 that opens to the second substrate face 42. It will be appreciated that OTAs 10b-g described hereinabove may be similarly modified by affixing the LD 22, the microlens 23, and optionally one or more of the polarization components of the isolator 30, such as for example the rotator 31, to the lid 11.

Figure 12:
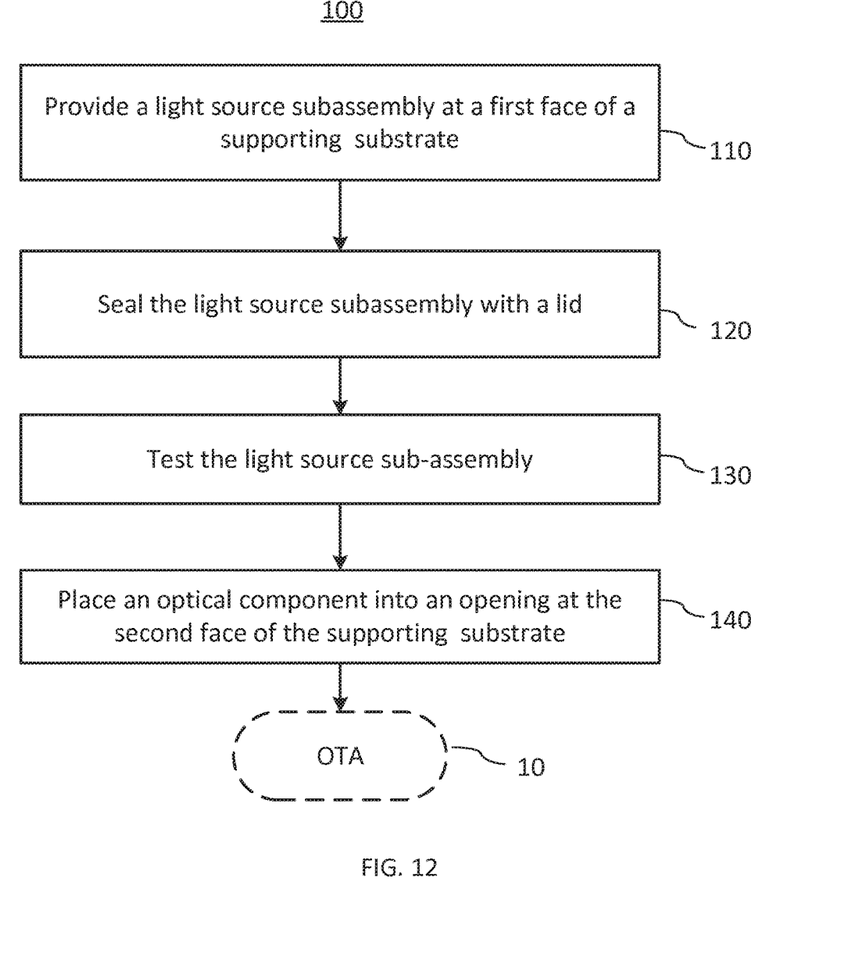
FIG. 12 is a flowchart of an exemplary method of fabrication of an OTA.

Referring now to FIG. 12, an aspect of the present disclosure provides a method of fabrication of an OTA, which is generally indicated with a label 100. General steps or operations of the method 100 are described hereinbelow by way of example with reference to embodiments illustrated in FIGS. 1-11, as follows. At step 110, a light source sub-assembly is provided at the first face 41 of the substrate 40, which has the back cavity 44 opening at the second face 42 of the substrate 40 opposing the first face 41. The light source sub-assembly may include the LD 22 configured to emit the light beam 99 along the substrate 40, the turning mirror 26 configured to direct the light beam through the substrate for vertical coupling into another device such as for example an integrated circuit chip, and the first microlens 24 disposed between the LD 22 and the turning mirror 26. At step 120, the light-source sub-assembly at the first substrate face 41 is sealed with the lid 11 to form the enclosure 21 protecting the LD 22 from the environment. In one embodiment, the process of sealing the light-source sub-assembly with the lid may be performed at an elevated temperature, for example above 150 centigrade. The sealed light-source sub-assembly may be tested at step 130 to verify its ability to generate light, and possibly to test one or more performance parameters of the sub-assembly as required for a particular application. At step 140, one or more optical components may be placed into the back cavity 44 from the second face 42 of the supporting substrate 40. In one embodiment, step 140 may include fixedly attaching the optical component or components placed into the back cavity 44 to the substrate 40, for example using a glue. In one embodiment of the method, step 140 includes placing an optical isolator 30 into the back cavity 44, providing a functional OTA 10. In one embodiment of the method, step 140 includes placing a half-wave plate and/or an optical polarizer into the back cavity 44. In one embodiment of the method, step 140 includes placing the second micro-lens 124 into the back cavity 44. Step 130 may be omitted or performed after step 140 in some embodiments. In one embodiment the method may include fabricating a plurality of OTAs from a single substrate, with step 110 include providing a plurality of light source subassemblies at the first face of the substrate and at a plurality of locations along the substrate, the substrate having a plurality of back cavities at the second face of the substrate opposite to the light source subassemblies to receive light therefrom. In this embodiment, step 120 may include sealing the plurality of light source sub-assemblies with a single lid to obtain a lid-covered substrate, the method further including dicing the lid-covered substrate to obtain a plurality of physically separate OTAs. In one implementation of this embodiment of the method, step 140 includes placing an optical component into each of the cavities prior to the dicing. Each of the optical components may be placed into a respective back cavity at step 140 so that the entire optical component is slightly recessed into the back cavity. One advantage of this is to reduce the likelihood of damaging the optical component during the dicing.

The above-described exemplary embodiments are intended to be illustrative in all respects, rather than restrictive, of the present invention. Thus the present invention is capable of many variations in detailed implementation that can be derived from the description contained herein by a person skilled in the art; all such variations and modifications are considered to be within the scope and spirit of the present invention as defined by the following claims. For example, although exemplary embodiments of the optical transmitter assembly of the present disclosure were described hereinabove primarily with reference to coupling light into silicon-based photonics chips, they may also be configured for other applications where vertical coupling of light may be useful. Furthermore, each of the exemplary embodiments described hereinabove may include features described with reference to other embodiments. For example the second microlens 124, which is described hereinabove with reference to OTA 10e of FIG. 8, may be added to any of the embodiments described hereinabove or variants thereof, including those described with reference to FIGS. 1, 3, 6, 7, 10, and 11. In any of the embodiment described hereinabove, the back cavity 44 may be configured to accept the entire optical component to be placed there so that the OTA may be mounted flush with an IC chip, and may be slightly recessed into the cavity in its entirety to reduce the likelihood of damaging during handling and/or dicing. In any of the embodiments described hereinabove the first microlens 24 and the second microlens 124, when present, may be a ball lens or an aspheric lens, or any other suitable lens including an astigmatism-compensating lens. Although illustrated as having a circular, cylindrical or spherical physical shape and being disposed in an opening 35, the microlenses 24 and 124 may have any other physical shape. Although illustrated as disposed in an opening 35, 135, the microlenses 24, 124 may be disposed directly on the first substrate face 41, in the opening of the first substrate face (as in FIG. 10) or directly on the lid surface of FIG. 11. In another example, each of the embodies described hereinabove with reference to FIGS. 4, 6-8 may include a second polarizer disposed optically prior to the polarization rotator 31, facing the LD 22. In a further example, although FIGS. 1, 3, 4, 6-11 show the turning mirror 26 deflecting the light beam 99 substantially by 90 degrees, this is not a requirement, and in each of the exemplary embodiments described hereinabove the turning mirror 26 may be configured, e.g. oriented, to deflect the light beam 99 at other angles, so that the light beam 99 may propagate through the substrate 40 at an angle to its faces 41, 42 that differs from 90°.

Thus, the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

We claim:

1. An assembly comprising:
    a substrate having a first face and a second face opposing the first face;
    a laser diode, disposed at the first face, to emit a light beam along the first face;
    a turning mirror, disposed at the first face, configured to re-direct the light beam to propagate into the substrate;
    a first microlens, disposed between the laser diode and the turning mirror, to collimate or focus the light beam; and
    an optical element, disposed between the first microlens and the turning mirror, to prevent back reflection of the light beam into the laser diode; and
    a second microlens, optically disposed after the turning mirror and in the substrate, in an optical path of the light beam.

2. The assembly of claim 1, further comprising:
    a lid, attached to the substrate at the first face, configured to form an enclosure for enclosing the laser diode, the turning mirror, the first microlens, and the optical element.

3. The assembly of claim 1, wherein the second microlens is disposed in an opening in the first face.

4. The assembly of claim 1, wherein the substrate includes a cavity that is positioned in the optical path of the light beam and configured to receive an optical component.

5. The assembly of claim 4, further comprising:
    one or more polarization processing optical components disposed within the cavity and in the optical path of the light beam.

6. The assembly of claim 5, wherein the one or more polarization processing optical components include one or more of an optical isolator, a half-wave plate, or a polarizer.

7. The assembly of claim 1, wherein the optical element is an isolator.

8. The assembly of claim 1, wherein the optical element is a non-reciprocal polarization rotator.

9. The assembly of claim 1, wherein at least one of the first microlens or the optical element is recessed into the first face.

10. The assembly of claim 1, wherein the optical path of the light beam traverses the substrate.

11. A method comprising:
   emitting, by a laser diode disposed at a first face of a substrate that includes a second face, a light beam along the first face;
   re-directing, by a turning mirror disposed at the first face, the light beam to propagate into the substrate;
   collimating or focusing, by a first microlens disposed between the laser diode and the turning mirror, the light beam;
   preventing, by an optical element disposed between the first microlens and the turning mirror back reflection into the laser diode; and
   shaping, by a second microlens optically disposed after the turning mirror and in the substrate, the light beam.

12. The method of claim 11, further comprising:
   affixing a lid to the substrate to form an enclosure for enclosing the laser diode, the turning mirror, the first microlens, and the optical element.

13. The method of claim 11, wherein the second microlens is disposed in an opening in the first face.

14. The method of claim 11, wherein the substrate includes a cavity that is positioned in an optical path of the light beam and configured to receive an optical component.

15. The method of claim 14, further comprising:
   disposing one or more polarization processing optical components within the cavity and in the optical path of the light beam.

16. The method of claim 15, wherein the one or more polarization processing optical components include one or more of an optical isolator, a half-wave plate, or a polarizer.

17. The method of claim 11, wherein the optical element is an isolator.

18. The method of claim 11, wherein the optical element is a non-reciprocal polarization rotator.

19. The method of claim 11, wherein at least one of the first microlens or the optical element is recessed into the first face.

20. The method of claim 11, wherein an optical path of the light beam traverses the substrate.

* * * * *